United States Patent

Samant et al.

(10) Patent No.: US 8,008,217 B2
(45) Date of Patent: *Aug. 30, 2011

(54) FABRICS WITH STRAIN-RESPONSIVE VISCOUS LIQUID POLYMERS

(75) Inventors: Kalika Ranjan Samant, Hockessin, DE (US); Bryan Benedict Sauer, Boothwyn, PA (US); Minshon J. Chiou, Chesterfield, VA (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 891 days.

This patent is subject to a terminal disclaimer.

(21) Appl. No.: 11/159,364

(22) Filed: Jun. 21, 2005

(65) Prior Publication Data

US 2006/0286882 A1    Dec. 21, 2006

(51) Int. Cl.
*B32B 27/04* (2006.01)
(52) U.S. Cl. ............ 442/134; 2/2.5; 89/36.01; 89/36.02; 89/36.05; 428/911; 442/135; 442/164; 442/169; 442/170; 442/181
(58) Field of Classification Search ...... 2/2.5; 89/36.01, 89/36.02, 36.05; 428/911; 442/134, 135, 442/164, 169, 170, 181
See application file for complete search history.

(56) References Cited

U.S. PATENT DOCUMENTS

| | | | |
|---|---|---|---|
| 4,678,702 A | 7/1987 | Lancaster et al. | |
| 5,061,545 A | 10/1991 | Li et al. | |
| 5,229,199 A | 7/1993 | Miner et al. | |
| 5,349,893 A * | 9/1994 | Dunn | 89/36.05 |
| 5,776,839 A | 7/1998 | Dischler et al. | |
| 2002/0037391 A1 | 3/2002 | Harpell et al. | |

FOREIGN PATENT DOCUMENTS

| | | |
|---|---|---|
| EP | 0 197 278 A2 | 10/1986 |
| EP | 0 620 410 A1 | 10/1994 |
| WO | WO 2004/074761 A1 | 9/2004 |
| WO | WO 2006/083312 A1 | 8/2006 |

OTHER PUBLICATIONS

Lee, Y.S. et al., N.J. Advanced Body Armor Utilizing Shear Thickening Fluids, 23rd Army Science Conference, 2002.

* cited by examiner

*Primary Examiner* — Andrew Piziali
*Assistant Examiner* — Peter Y Choi

(57) ABSTRACT

A penetration resistant article with an area density less than 1.5 lb/ft$^2$ made of a plurality of fibrous fabric layers that have applied thereto about 1 to 8 percent by weight of a polymer having a glass transition temperature in the range of minus 40 to about 0° C. and a zero shear melt viscosity $2 \times 10^6$ to about $10^{13}$ poise at 20° C.

12 Claims, No Drawings

FABRICS WITH STRAIN-RESPONSIVE VISCOUS LIQUID POLYMERS

BACKGROUND OF THE INVENTION

1. Field of the Invention

The present invention is related to fabrics having a fiber structure to which is applied low glass transition temperature viscous polymer adhesives.

2. Description of Related Art

Current soft body armor systems made from woven fabrics require high weight density per unit area, partly in order to achieve less than 44 mm back face deformation (BFD) as required by NIJ standard 0101.04 Rev. A. BFD is an indicator of blunt trauma, the lower the BFD, the better the protection from blunt trauma. Although many soft body armor constructions can adequately stop ballistic projectiles, the shock associated with blunt trauma can still cause substantial injury or death. Consequently, high-end lightweight vests typically use hybrids of woven fabrics with substantial amounts of non-woven laminated structures, such as Honeywell's Goldflex® or Spectrashield®.

U.S. Pat. No. 5,776,839 discloses the application of dilatant dry powders, with a typical composition consisting of carbon black, fumed silica (nano-silica), and a small amount of adhesive "glue" to ballistic fibers and fabrics.

U.S. Pat. No. 5,229,199 considered rigid composites of woven aramid fabrics coated with an adhesion modifier and imbedded in a matrix resin. The reduced friction and weakened interfaces led to improved ballistic performance. If friction is too high in a fabric, or if the matrix is too stiff, ballistic resistance is severely compromised.

Lee, Y. S. et al. (N.J. Advanced Body Armor Utilizing Shear Thickening Fluids, $23^{rd}$ Army Science Conference, 2002) consider shear-thickening suspensions of particles in conjunction with ballistic fibers.

U.S. Pat. No. 4,678,702 discloses a protective laminate formed by bonding layers of Kevlar® fabric together by layers of Surlyn® under heat and pressure to cause the Surlyn® to flow into and encapsulate the yarn of the Kevlar® fabric.

Fabrics impregnated with solid adhesives, such as polyethylene film, in monolithic systems could lead to a significant loss of penetration resistance due to a combination of high stiffness, the processing conditions needed for impregnation and to the absence of some of the ballistically significant material, such as Kevlar®, a polyaramid available from E.I. du Pont de Nemours and Co, Wilmington, Del. (DuPont).

Woven fabric based soft body armors typically exhibit large BFD, thereby requiring higher basis weight for compliance with NIJ standard 0101.04 Rev. A. For example, current vests made of 100% woven Kevlar® can weigh more than 1.0 psf to achieve Level II protection under the NIJ standard. Some film-impregnated fabrics, (such as those with polyethylene film) are typically used in conjunction with untreated fabric layers, with the impregnated layers placed nearer the body to control BFD. Such hybrid systems are needed in order to compensate for the weight gain associated with film lamination and to minimize overall stiffness of the assembly. Nevertheless, such solutions often significantly compromise ballistic resistance.

BRIEF SUMMARY OF THE INVENTION

This invention is directed to penetration resistant article made from a plurality of fabric layers that include fibers and a polymer having a glass transition temperature in the range of $-40$ to about $0°$ C., and a zero shear melt viscosity of about $2 \times 10^6$ to about $10^{13}$ poise at $20°$ C. and the article has an area density less than 1.5 lb/ft$^2$ and the polymer is 1 to about 8 percent by weight of the fabric.

DETAILED DESCRIPTION OF THE INVENTION

The present invention provides for significantly reducing the area density of woven fabric systems for soft body armor systems by incorporating strain-responsive viscous liquid polymers, such as described in co-pending US patent application assigned to DuPont, designated internally as KB-4800. Such systems have a superior balance of $V_{50}$ and BFD.

A reduction of about 20% in the basis weight from about 1 psf to about 0.84 psf has been demonstrated with this invention. In addition to reduced BFD well below 44 mm, $V_{50}$ remains relatively unaffected, despite using fewer ballistically significant Kevlar® layers, thus permitting basis weight reduction. $V_{50}$ is the critical velocity in meters per second (m/s) where half of the bullets are completely stopped by a panel and half penetrate through the panel.

Moreover, because of the strain-responsive nature of coated fabrics, the protective systems, vests for example, remain flexible and comfortable during normal usage, becoming locally rigid only upon impact at ballistic strain rates. Without being bound by any particular theory, it is believed that the adhesive polymer "ligaments" that are present at the yarn crossovers are broken and reformed as the viscous polymer is able to flow and recreate such "ligaments". However, solid adhesives, such as Kraton®, do not exhibit this self-healing, most likely because they do not exhibit strain hardening as do the polymers of this invention. Diagonal stretch data in Table I demonstrates this difference. It has been further shown by analysis of recovered projectiles from ballistic tests that the fabrics coated with the subject strain responsive polymers, such as ethylene/methyl acrylate copolymer, polyvinyl propionate) and poly(hexyl methacrylate) significantly stiffen up upon ballistic impact. Furthermore, cross-sectional images of captured projectiles indicate significantly higher projectile blunting and damage using the inventive system, which further attests to the better BFD performance.

The present invention utilizes small amounts of strain-responsive viscous liquid polymer with appropriate molecular weight and $T_g$ as described in KB-4800. Such polymers, when applied in small amounts in accordance with this invention, provides a flexible system that has a superior balance of BFD and $V_{50}$ at lower basis weight than currently possible. As noted above, these systems produce a significantly higher degree of projectile damage and blunting) that are often characteristic of non-woven systems such as Goldflex® or Spectrashield®, but with increased comfort.

Ballistic resistance of fiber fabrics is an extremely complex problem because of the interplay of a very large number of variables and the extremely short time (about 100 microseconds) of the event. Selecting an appropriate strain-responsive polymer that will perform satisfactorily against a large number of criteria is very challenging, especially since such material properties are not typically achieved at such high strain rates. Additional challenges arise in impregnating fabric and finally designing a low basis weight vest with the necessary balance of penetration resistance and protection from blunt trauma.

EXAMPLES

Advantages are further exemplified in the examples below. Plain weave fabric pieces of 840 denier (930 dtex) poly(paraphenylene terephthalamide) yarn available from DuPont under the trademark KEVLAR® were woven at 26×26 ends per inch (10.2×10.2 ends per centimeter) for use as the base fabric.

copolymer having a high MW of about 100,000 g/mol and a zero shear rate melt viscosity of $1 \times 10^7$ Poise (Po) at 20° C. measured by capillary viscometry is referred to as "E/MA-high". It is available as Vamac® VCD 6200 from DuPont. An ethylene/methyl acrylate (38/62 w/w %) with a glass transition temperature of −32° C. having a medium Mw of about 40,000 g/mol and a zero shear rate melt viscosity of $6 \times 10^6$ Po at 20° C. and is referred to as "E/MA-medium". It is an experimental grade made by DuPont.

Ballistic tests were conducted against a 0.357 magnum bullet, based on the test protocol for NIJ Level II as described in NIJ Standard-0101.04 entitled "Ballistic Resistance of Personal Body Armor". The back face deformation of no more than 44 mm is required to meet the performance requirement. Results of the ballistic tests, including both $V_{50}$ and back face deformation were shown in Table I.

Examples 1-4

Twenty layers for each of the following fabric layers for Examples 1-4 were made into various composite structures of about 15"×15" size panels with an area density of about 4.1 kg/sq m.

Example 1 was prepared by scouring, i.e., multiple water rinsings to remove finish oil (as disclosed in co-pending patent application, also assigned to Dupont and designated internally as KB-4805) and then coating the base fabric with about 4.7 wt % E/MA-medium from a 7% solution in toluene.

Example 2 was prepared by scouring and then coating the base fabric with about 4.9 wt % E/MA-medium from a 20% solution in toluene.

Example 3 was prepared by scouring and coating the base fabric with about 4.7 wt % with wt % E/MA-high from a 20% solution in toluene.

Example 4 was prepared by scouring and coating the base fabric with about 4.5 wt % E/MA-medium from a 15% solution in toluene.

It is noted that, with an area density of about 4.1 kg per square meter, Examples 1 to 4 all showed good ballistic $V_{50}$ and low back face deformation, i.e. 31 to 39 mm opposite the NIJ back face deformation requirement of less than 44 mm.

Comparative Example A

In this comparative example, twenty-one layers of the base fabric layer were made into a composite structure of about 15-inch×15-inch panels with an area density of about 4.1 kg/sqm. Ballistic tests, based on the same test protocol employed for Examples 1-4 for NIJ Level II were conducted.

The results, as shown in Table I, indicate that while its ballistic $V_{50}$ was acceptable, the back face deformations were marginal opposite the NIJ back face deformation requirement.

Comparative Example B

This comparative example was prepared by scouring and coating the base fabric with about 8.5 wt % E/MA-medium from a 7% solution in toluene. Nineteen layers of the coated fabric were made into a composite structure of about 15"×15" panel with an area density of about 4.1 kg/sqm. Ballistic tests, based on the same test protocol employed for Examples 1-4 for NIJ Level II were conducted.

It is noted that the panel showed a poor ballistic $V_{50}$ value, which resulted in a penetration, by the 0.357 magnum bullet when tested at 436±10 m/sec.

Comparative Example C

This comparative example was prepared by laminating the base fabric layer with a layer of Surlyn® film of about 23 micrometers thickness under the press condition of about 127° C. and 100 psi for about 20 minutes. Surlyn® is available from DuPont. Seventeen layers were made into a composite structure of about 15"×15" size panel with an area density of about 4.1 kg/sqm. Ballistic tests, based on the same test protocol employed for Examples 1-4 for NIJ Level II were conducted.

The results, as shown in Table I, indicate that the fabric layers laminated with Surlyn® film showed a poor ballistic $V_{50}$ which resulted in a penetration by the 0.357 magnum bullet when tested at 436±10 m/sec.

TABLE 1

| Example No. | # layers | Area density | BFD | $V_{50}$ m/sec |
|---|---|---|---|---|
| 1 | 20 | 4.1 | 33; 37 | 479 |
| 2 | 20 | 4.1 | 32; 38 | 467 |
| 3 | 20 | 4.1 | 39; 31 | 482 |
| 4 | 20 | 4.1 | 32; 35 | 476 |
| Comp. A | 21 | 4.1 | 40; 38; 41; 44 | 488 |
| Comp. B | 19 | 4.1 | penetrated | 439 |
| Comp. C | 17 | 4.1 | penetrated | 431 |

BFD was measured in mm based on a 0.357 magnum bullet at 436±10 m/sec

Examples 5-9

Examples of woven polyaramid fabrics were coated with various amounts of either E/MA-medium or E/MA-high. For the comparative example, the fabric was coated with Kraton® a solid adhesive available from Kraton Polymers Co., Houston Tex. The test samples measured 6 cm×6 cm and were stretched by gripping at opposite diagonal corners. The testing essentially determines the in-plane shear deformation properties at low strain rates (0.2 inches/min), with the strain applied at a 45 degree angle to the warp and weft directions. The test is terminated at low forces relative to the strength of the fabric in order to protect the load cell and also to prevent fiber damage to the fabric so that multiple cycles could be applied to the same sample. Not intending to be bound by any particular theory, it is believed that initially the comparative examples and the working examples behave similarly. With increasing load, a large departure occurs as the "ligaments" of the polymer adhesives of the inventive examples are twisted and stretched, while in the comparative example, free twisting and sliding of the fiber bundles occur. Finally at higher extension levels "the ligaments" become over stretched and progressively break down until the fabric itself starts to become substantially loaded at the highest stresses. Diagonal stretch data is presented in Table 2.

TABLE 2

| Example | Coating | Peak Force, gm | | |
|---|---|---|---|---|
| 5 | 4.4% E/MA-high | $1^{st}$ cycle | | 190 |
| | | $2^{nd}$ cycle | | 125 |
| | | $3^{rd}$ cycle | (after 48 hrs) | 160 |

TABLE 2-continued

| Example | Coating | | | Peak Force, gm |
|---|---|---|---|---|
| 6 | 6% E/MA-high | 1st cycle | | 290 |
| | | 2nd cycle | | 170 |
| | | 3rd cycle | (after 48 hrs) | 290 |
| 7 | 3.1% E/MA-med | 1st cycle | | 200 |
| | | 2nd cycle | | 110 |
| | | 3rd cycle | (after 48 hrs) | 120 |
| 8 | 6% E/MA-med | 1st cycle | | 220 |
| | | 2nd cycle | | 160 |
| | | 3rd cycle | (after 48 hrs) | 210 |
| 9 | 10% E/MA-med | 1st cycle | | 250 |
| | | 2nd cycle | | 145 |
| | | 3rd cycle | (after 4 hrs) | 225 |
| D | 7% Kraton ® | 1st cycle | | 900 |
| | | 2nd cycle | | 210 |
| | | 3rd cycle | (after >3 hrs) | 230 |

The fabrics impregnated with the ethylene/methyl acrylate copolymers show significant self-healing as indicted by maintaining peak forces through the stretching cycles. On the other hand, the solid adhesive as represented by Comparative Example D does not recover the first cycle peak forces upon subsequent cycles, thus indicating a lack of self-healing. The results illustrate the practical advantage of the liquid adhesives as strain hardening materials that stiffen upon ballistic impact and can repair themselves.

What is claimed is:

1. A penetration resistant article comprising a plurality of fabric layers, at least one layer comprising;
   fibers and a liquid polymer, selected from the group consisting ethylene/methyl acrylate, polyvinyl propionate, poly (hexyl methacrylate), and mixtures thereof, the polymer having;
   a glass transition temperature in the range of minus 40 to about 0° C., and
   a zero shear melt viscosity $2\times10^6$ to about $10^{13}$ poise at 20° C. wherein the article has an area density less than 1.5 lb/ft$^2$ and the polymer is 1 to about 8 percent by weight of the fabric.

2. The article of claim 1 wherein the fibers of the fabric layers are selected from the group consisting of aromatic polyamide, polyolefin, polybenzoxazole, polybenzothiazole, poly{2,6-diimidazo[4,5-b4', 5'-e]pyridinylene-1,4(2,5-dihydroxy)phenylene}, polyareneazoles, polypyridazoles, polypyridobisimidazoles, and mixtures thereof.

3. The article of claim 1, having 10 to 60 layers.

4. The article of claim 1, wherein the polymer is coated onto the fabric.

5. The article of claim 1, wherein the polymer is at least partially impregnated into the fabric structure.

6. The article of claim 4, wherein the polymer is ethylene/methyl acrylate.

7. The article of claim 4 wherein at least one coated layer is self-healing and exhibits at least 50% recovery In peak force associated with in-plane straining of the fabric.

8. The article of claim 1, wherein the back face deformation is less than 44 mm when tested in compliance with NIJ standard 0101.04.

9. The penetration resistant article of claim 6, wherein the polymer comprises about 1 to about 8 percent by weight of the fabric.

10. A penetration resistant article comprising a plurality of fabric layers at least one layer comprising fibers and a liquid polymer selected from the group consisting of ethylene-methyl acrylate, polyvinyl propionate, poly(hexyl methacrylate), and mixtures thereof, the polymer having a glass transition temperature in the range of minus 40 to about 0° C., and a zero shear melt viscosity $2\times10^6$ to about $10^{13}$ poise at 20° C. that is 8% by weight or less of the layer, wherein the article has at least a 10% improvement in back face deformation compared to an identically constructed article not having the polymer when tested in compliance with NIJ standard 0101.04.

11. The penetration resistant article of claim 1, wherein the fabric is woven.

12. The penetration resistant article of claim 10, wherein the liquid polymer is ethylene-methyl acrylate.

* * * * *